L. LANDKAMER.
WHIP SOCKET BRACKET.
APPLICATION FILED MAY 14, 1909.
935,664.
Patented Oct. 5, 1909.
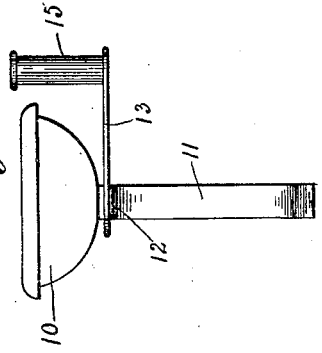
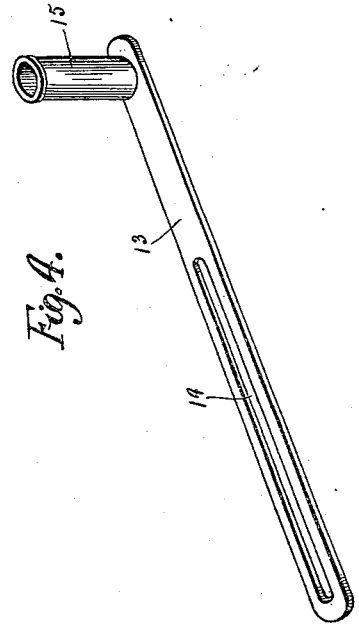
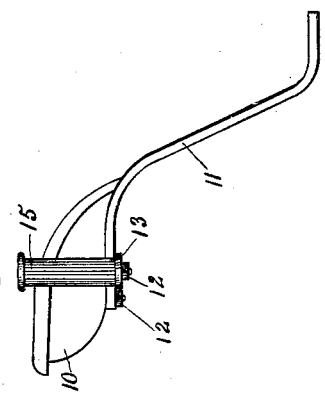
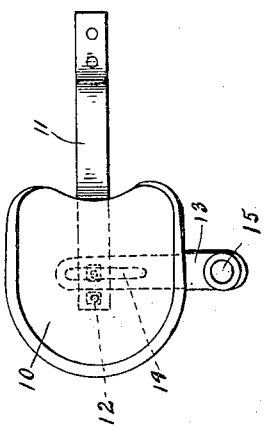
Inventor
Levi Landkamer.

UNITED STATES PATENT OFFICE.

LEVI LANDKAMER, OF ALEXANDRIA, NEBRASKA.

WHIP-SOCKET BRACKET.

935,664.

Specification of Letters Patent. Patented Oct. 5, 1909.

Application filed May 14, 1909. Serial No. 495,994.

*To all whom it may concern:*

Be it known that I, LEVI LANDKAMER, a citizen of the United States, residing at Alexandria, in the county of Thayer, State of Nebraska, have invented certain new and useful Improvements in Whip-Socket Brackets; and I do hereby declare the following to be a full, clear, and exact description of the invention, such as will enable others skilled in the art to which it appertains to make and use the same.

This invention relates to devices for supporting a whip socket in convenient position relative to the seats of agricultural implements such as mowing and harvesting machines riding sulkies and listers and the like, and has for one of its objects to provide a simply constructed device which may be adjustably clamped to the seat.

Much difficulty is experienced by the drivers of agricultural machinery of various kinds, such as sulky plows, listers, riding cultivators, mowing and harvesting machinery and the like in handling the reins, the various levers by which the machinery is controlled, and the whip, simultaneously, and the principal object of the present invention is to provide a simply constructed device whereby a whip socket may be supported in convenient position relative to the driver's seat, while at the same time adjustable to adapt it to the seats of various forms, and to seats located at different points on the machinery, while at the same time readily adaptable to the various constructions of machinery with which it is to be employed.

With this and other objects in view, the invention consists in certain novel features of construction as hereafter shown and described and then specifically pointed out in the claims, and in the drawings illustrative of the preferred embodiment of the invention, Figure 1 is a side view of a conventional seat and its supporting standard with the improvement applied. Fig. 2 is a rear elevation of the same. Fig. 3 is a plan view of the same. Fig. 4 is a perspective view enlarged of the improved device, detached.

Seats of the character to which the improvement is applicable are formed of metal, and generally supported upon a slightly resilient or yieldable standard, and for the purpose of illustration a conventional seat of this character is represented at 10 and the supporting standard at 11, the standard being connected to the seat by bolts 12.

The improved device comprises a bracket member 13 having a longitudinal slot 14 through which one of the bolts 12 is adapted to pass, whereby the bracket is adjustably coupled to the standard 11 and extending laterally beneath the seat, with its free end projecting beyond the same and provided with a whip socket 15. By this means the whip socket is supported in convenient position relative to the seat, and may be adjusted to any desired extent and swung forwardly or backwardly upon its supporting bolt, to locate the whip socket at any desired distance from the seat. The bracket may also be reversed in position to locate the whip socket at the opposite side of the seat to adapt the device to left-handed drivers, or to persons who prefer to handle the whip with the left hand. The bracket and its socket are constructed of metal as light as possible consistent with the strains to which they will be subjected. By this means the whip may be deposited in a convenient and readily accessible position, leaving the hands of the driver free to handle the reins and the various operating levers. The whip socket portion also provides a convenient device around which to wind the reins when the driver leaves the machinery temporarily.

It will thus be obvious that a simply constructed and convenient device is produced which may be readily attached without structural changes to any of the various machines above noted.

What is claimed, is:—

1. The combination with a seat of the class described of a standard, bolts operating to secure the seat to the standard, a member having a longitudinal slot through which one of said standard bolts passes and by means of which the member is adjustably coupled to the standard and extends laterally beyond the seat, and a whip socket carried by the bracket at its free end.

2. The combination with a seat of the class described of a standard, securing means between said seat and standard, a member having a whip socket at one end, said member being secured to the standard by the fastening means which unite the seat and standard.

In testimony whereof, I affix my signature, in presence of two witnesses.

LEVI LANDKAMER.

Witnesses:
 F. E. HEMENOVER,
 C. A. BECK.